United States Patent
Asaura et al.

(10) Patent No.: US 10,823,040 B2
(45) Date of Patent: *Nov. 3, 2020

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Shinya Asaura, Numazu (JP); Masaaki Sato, Susono (JP); Ryohei Ono, Susono (JP); Yuji Miyoshi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 681 days.

This patent is subject to a terminal disclaimer.

(21) Appl. No.: 15/634,073

(22) Filed: Jun. 27, 2017

(65) Prior Publication Data

US 2018/0003100 A1    Jan. 4, 2018

(30) Foreign Application Priority Data

Jun. 30, 2016 (JP) .................... 2016-129941

(51) Int. Cl.
*F01P 3/20* (2006.01)
*F01N 3/20* (2006.01)
(Continued)

(52) U.S. Cl.
CPC ............ *F01P 3/20* (2013.01); *B01D 53/9418* (2013.01); *B01D 53/9495* (2013.01); *B01J 23/44* (2013.01);
(Continued)

(58) Field of Classification Search
CPC combination set(s) only.
See application file for complete search history.

(56) References Cited

U.S. PATENT DOCUMENTS 5,605,042 A    2/1997  Stutzenberger
6,513,323 B1 *  2/2003  Weigl ................. B01D 53/9431
                                                        60/286
(Continued)

FOREIGN PATENT DOCUMENTS

DE            44 36 397 A1    4/1996
DE    10 2006 009 934 A1    9/2007
JP          2012-97729       5/2012

OTHER PUBLICATIONS

S. Asaura et al., "Exhaust Gas Control System," U.S. Appl. No. 15/634,156, filed Jun. 27, 2017.

(Continued)

*Primary Examiner* — Binh Q Tran
(74) *Attorney, Agent, or Firm* — Finnegan, Henderson, Farabow, Garrett & Dunner, LLP

(57) ABSTRACT

An exhaust gas control system includes an upstream purification device disposed in an exhaust passage of the internal combustion engine, a downstream purification device disposed in a portion of the exhaust passage downstream from the upstream purification device, a fuel addition valve disposed in a portion of the exhaust passage upstream from the upstream purification device, and a urea addition valve disposed in a portion of the exhaust passage between the upstream purification device and the downstream purification device, and a cooling device. The cooling device is configured such that refrigerant cools the fuel addition valve first and then cools the urea addition valve subsequent to the fuel addition valve.

8 Claims, 11 Drawing Sheets

(51) Int. Cl.
    *F01N 3/36*         (2006.01)
    *F01N 3/10*         (2006.01)
    *F01N 13/00*       (2010.01)
    *B01D 53/94*       (2006.01)
    *B01J 23/44*       (2006.01)
    *B01J 29/06*       (2006.01)
    *B01J 35/00*       (2006.01)
    *B01J 35/04*       (2006.01)
    *F01N 3/035*      (2006.01)
    *F02B 23/02*      (2006.01)
    *F02B 37/00*      (2006.01)

(52) U.S. Cl.
    CPC ........... *B01J 29/06* (2013.01); *B01J 35/0006* (2013.01); *B01J 35/04* (2013.01); *F01N 3/035* (2013.01); *F01N 3/103* (2013.01); *F01N 3/208* (2013.01); *F01N 3/2033* (2013.01); *F01N 3/2066* (2013.01); *F01N 3/36* (2013.01); *F01N 13/009* (2014.06); *F01N 13/011* (2014.06); *F02B 23/02* (2013.01); *F02B 37/00* (2013.01); *B01D 2255/1021* (2013.01); *B01D 2255/1023* (2013.01); *B01D 2255/50* (2013.01); *F01N 2260/024* (2013.01); *F01N 2610/01* (2013.01); *F01N 2610/02* (2013.01); *F01N 2610/03* (2013.01); *F01N 2610/11* (2013.01); *F01N 2610/1453* (2013.01); *F01P 2060/12* (2013.01); *Y02T 10/125* (2013.01); *Y02T 10/144* (2013.01); *Y02T 10/24* (2013.01)

(56) References Cited

U.S. PATENT DOCUMENTS

| | | | | |
|---|---|---|---|---|
| 7,614,213 | B2* | 11/2009 | Hirata | ..................... F01N 3/208 |
| | | | | 60/277 |
| 8,303,174 | B2* | 11/2012 | Kasahara | .............. F01N 3/2066 |
| | | | | 374/1 |
| 8,875,502 | B2* | 11/2014 | Fuchs | ................... F01N 3/2066 |
| | | | | 60/274 |
| 2009/0205322 | A1 | 8/2009 | Braun et al. | |
| 2015/0240682 | A1* | 8/2015 | Gupta | ...................... F01N 9/00 |
| | | | | 60/274 |
| 2018/0003095 | A1 | 1/2018 | Asaura et al. | |

OTHER PUBLICATIONS

Notice of Allowance issued in U.S. Appl. No. 15/634,156 dated Nov. 8, 2018.

* cited by examiner

EXHAUST GAS CONTROL SYSTEM FOR INTERNAL COMBUSTION ENGINE

INCORPORATION BY REFERENCE

The disclosure of Japanese Patent Application No. 2016-129941 filed on Jun. 30, 2016 including the specification, drawings and abstract is incorporated herein by reference in its entirety.

BACKGROUND

1. Technical Field

The present disclosure relates to an exhaust gas control system for an internal combustion engine.

2. Description of Related Art

Japanese Patent Application Publication No. 2012-097729 discloses an exhaust gas control system for an internal combustion engine including an oxidation catalyst, a selective catalytic reduction catalyst (SCR catalyst), a fuel addition valve, and a urea addition valve. In the exhaust gas control system in Japanese Patent Application Publication No. 2012-097729, the oxidation catalyst is disposed in an exhaust passage of the internal combustion engine. The SCR catalyst is disposed in a portion of the exhaust passage downstream from the oxidation catalyst. The fuel addition valve is disposed in a portion of the exhaust passage upstream from the oxidation catalyst to add fuel into exhaust gas. The urea addition valve is disposed in a portion of the exhaust passage between the fuel addition valve and the SCR catalyst to add urea aqueous solution into exhaust gas.

SUMMARY

When the fuel addition valve or the urea addition valve is exposed to high-temperature exhaust gas, the fuel or the urea aqueous solution stagnating around the nozzle hole of the fuel addition valve or the urea addition valve may be overheated to the temperature that causes deterioration of the fuel or the urea aqueous solution. This may induce undesirable situations such as operation failure of the fuel addition valve or the urea addition valve. As a solution to the above problem, methods for cooling the fuel addition valve and the urea addition valve with refrigerant, such as coolant and lubricant oil, may be considered.

Here, the temperature at which fuel deteriorates is different from the temperature at which urea aqueous solution deteriorates. Accordingly, a method may be considered in which the fuel addition valve and the urea addition valve are cooled with cooling circuits independent of each other. However, when such a plurality of independent cooling circuits are provided, piping of the refrigerant is complicated, which may cause degradation in on-vehicle mountability. Accordingly, in consideration of the on-vehicle mountability of the exhaust gas control system including the cooling circuits, it is desirable that the fuel addition valve and the urea addition valve are cooled in a shared cooling circuit. Urea aqueous solution tends to deteriorate at temperature lower than fuel. Accordingly, a method for constituting a cooling circuit so as to cool the urea addition valve in preference to the fuel addition valve may be considered. However, when the urea addition valve is cooled in preference to the fuel addition valve, the urea addition valve may excessively be cooled to the temperature lower than the melting point of urea, which may result in precipitation of urea. Moreover, since the fuel addition valve is disposed in a portion of the exhaust passage upstream from the urea addition valve, the fuel addition valve is more often exposed to high-temperature atmosphere than the urea addition valve. Therefore, cooling the urea addition valve in preference to the fuel addition valve may cause insufficient cooling of the fuel addition valve. This may cause failure in suppressing fuel deterioration.

The present disclosure provides an exhaust gas control system for an internal combustion engine including a fuel addition valve and a urea addition valve, the exhaust gas control system being capable of appropriately cooling the fuel addition valve and the urea addition valve.

An aspect of the present disclosure provides an exhaust gas control system for an internal combustion engine. The internal combustion engine is a compression ignition-type internal combustion engine operated to perform lean combustion. The exhaust gas control system includes an upstream purification device, a downstream purification device, a fuel addition valve, a urea addition valve, and a cooling device. The upstream purification device is disposed in an exhaust passage of the internal combustion engine. The upstream purification device includes an oxidation catalyst. The downstream purification device is disposed in a portion of the exhaust passage downstream from the upstream purification device. The downstream purification device includes a selective catalytic reduction catalyst (SCR catalyst). The fuel addition valve is disposed in a portion of the exhaust passage upstream from the upstream purification device. The fuel addition valve is configured to add fuel into exhaust gas of the internal combustion engine. The urea addition valve is disposed in a portion of the exhaust passage between the upstream purification device and the downstream purification device. The urea addition valve is configured to add urea aqueous solution into the exhaust gas. The cooling device has a cooling passage configured to carry refrigerant flowing through the cooling passage. The cooling passage is configured such that the refrigerant cools the fuel addition valve first and then cools the urea addition valve subsequent to the fuel addition valve.

According to the exhaust gas control system, out of the fuel addition valve and the urea addition valve, the fuel addition valve is preferentially cooled since the fuel addition valve is exposed more to high-temperature atmosphere. Accordingly, it becomes possible to prevent the fuel addition valve from being overheated to the temperature that causes deterioration of fuel due to the fuel addition valve being exposed to the high-temperature exhaust gas. Since the urea addition valve is cooled with the refrigerant after receiving heat of the fuel addition valve, it also becomes possible to prevent the urea addition valve from being overcooled to the temperature lower than the melting point of urea.

As described in the foregoing, when the urea addition valve is disposed downstream from the upstream purification device, it is assumed that the urea addition valve is exposed to the exhaust gas whose temperature is increased due to reaction heat. The reaction heat is generated when unburned fuel components (fuel components not burned in the internal combustion engine) discharged from the internal combustion engine are oxidized with the oxidation catalyst of the upstream purification device. It is also assumed that, for warming the SCR catalyst of the downstream purification device or other purposes, treatment involving supply of fuel from the fuel addition valve to the upstream purification device is executed to actively increase the amount of reaction heat generated in the oxidation catalyst of the upstream purification device. Also in such a case, the urea addition valve is exposed to the exhaust gas having higher temperature. However, since the refrigerant cools the urea addition valve subsequent to the fuel addition valve according to the above configuration, no cooling objects except for the fuel addition valve and the urea addition valve are disposed between the fuel addition valve and the urea addition valve. Accordingly, the temperature at the time when the refrigerant reaches the urea addition valve can be suppressed as low as possible in the range where overcooling of the urea addition valve can be suppressed. Therefore, it becomes possible to suitably prevent the urea addition valve from being overheated to the temperature that causes deterioration of the urea aqueous solution, even in the situation where the urea addition valve is exposed to the exhaust gas whose temperature increases due to various factors described before.

Therefore, the exhaust gas control system can suppress overcooling of the urea addition valve, while suppressing overheating of the fuel addition valve and the urea addition valve.

In the exhaust gas control system, the upstream purification device may include, in addition to the oxidation catalyst, a particulate filter configured to collect matter (PM) in the exhaust gas. In the exhaust gas control system configured in this way, when it is estimated that the amount of PM accumulated in the particulate filter becomes equal to or more than a specified threshold, fuel is supplied from the fuel addition valve to the oxidation catalyst. As a result, treatment (referred to as "filter regeneration treatment" below) is executed to heat the particulate filter to a PM oxidable temperature using the reaction heat of the fuel and to thereby oxidize and eliminate PM accumulated on the particulate filter. When such filter regeneration treatment is executed, the urea addition valve is exposed to the exhaust gas having higher temperature. To cope with this situation, the exhaust gas control system is configured such that the refrigerant cools the urea addition valve subsequent to the fuel addition valve as described above. As a consequence, the temperature of the refrigerant at the time when the refrigerant reaches the urea addition valve can be suppressed as low as possible in the range where overcooling of the urea addition valve can be suppressed. Therefore, even when the aforementioned filter regeneration treatment is executed, it becomes possible to suitably prevent the urea addition valve from being overheated to the temperature that causes deterioration of the urea aqueous solution.

Here, in internal combustion engines such as V-type internal combustion engines and in-line multiple cylinder internal combustion engines, the exhaust gas control system may be divided into two systems. In such a case, in the exhaust gas control system, the exhaust passage may include a first exhaust passage and a second exhaust passage. The upstream purification device may include a first upstream purification device and a second upstream purification device. The first upstream purification device may be disposed in the first exhaust passage. The second upstream purification device may be disposed in the second exhaust passage. The downstream purification device may include a first downstream purification device and a second downstream purification device. The first downstream purification device may be disposed in a portion of the first exhaust passage downstream from the first upstream purification device. The second downstream purification device may be disposed in a portion of the second exhaust passage downstream from the second upstream purification device. The fuel addition valve may include a first fuel addition valve and a second fuel addition valve. The first fuel addition valve may be disposed in a portion of the first exhaust passage upstream from the first upstream purification device. The second fuel addition valve may be disposed in a portion of the second exhaust passage upstream from the second upstream purification device. The urea addition valve may include a first urea addition valve and a second urea addition valve. The first urea addition valve may be disposed in a portion of the first exhaust passage between the first upstream purification device and the first downstream purification device. The second urea addition valve may be disposed in a portion of the second exhaust passage between the second upstream purification device and the second downstream purification device. The cooling passage may include a first cooling passage and a second cooling passage. The first cooling device may be configured such that the refrigerant cools the first fuel addition valve first and then cools the first urea addition valve subsequent to the first fuel addition valve. The second cooling passage may be configured such that the refrigerant cools the second fuel addition valve first and then cools the second urea addition valve subsequent to the second fuel addition valve. The above configuration makes it possible to suppress overcooling of two urea addition valves while suppressing overheating of two fuel addition valves and the two urea addition valves, even when two exhaust gas control systems are provided.

In internal combustion engines such as V-type internal combustion engines and in-line multiple cylinder internal combustion engines, part of the exhaust gas control system may be divided into two systems. In such a case, in the exhaust gas control system, the exhaust passage may include a first exhaust passage, a second exhaust passage, and a third exhaust passage. The third exhaust passage may be connected to a merging portion between the first exhaust passage and the second exhaust passage. The upstream purification device may include a first upstream purification device and a second upstream purification device. The first upstream purification device may be disposed in the first exhaust passage. The second upstream purification device may be disposed in the second exhaust passage. The downstream purification device may be disposed in the third exhaust passage. The fuel addition valve may include a first fuel addition valve and a second fuel addition valve. The first fuel addition valve may be disposed in a portion of the first exhaust passage upstream from the first upstream purification device. The second fuel addition valve may be disposed in a portion of the second exhaust passage upstream from the second upstream purification device. The urea addition valve may be disposed in a portion of the third exhaust passage upstream from the downstream purification device. The cooling passage may include a first cooling passage, a second cooling passage, and a third cooling passage. The first cooling passage may be configured such that the refrigerant travels through the first fuel addition valve. The second cooling passage may be configured such that the refrigerant travels through the second fuel addition valve. The third cooling passage may be connected to a merging portion between the first cooling passage and the second cooling passage. The third cooling passage may be configured such that the refrigerant that traveled through the first fuel addition valve and the second fuel addition valve travels through the urea addition valve. The first cooling passage, the second cooling passage, and the third cooling passage may be configured such that the refrigerant that cooled the first fuel addition valve cools the urea addition valve subsequent to the first fuel addition valve, and the refrigerant that cooled the second fuel addition valve cools the urea addition valve subsequent to the second fuel addition valve. The above configuration makes it possible to suppress overcooling of the urea addition valve while suppressing overheating of the two fuel addition valves and the urea addition valve, even when part of the exhaust gas control system is divided into two systems.

The internal combustion engine may be configured to be cooled with the refrigerant. In the exhaust gas control system, the cooling device may include a radiator configured to radiate heat of the refrigerant that traveled through the internal combustion engine. The cooling passage may be configured such that some of the refrigerant after traveling through the radiator and before traveling through the internal combustion engine flows through the fuel addition valve and the urea addition valve in order. The above configuration makes it possible to more reliably suppress the temperature of the refrigerant low when the refrigerant travels through the urea addition valve and the fuel addition valve. As a result, overheating of the fuel addition valve and the urea addition valve can be suppressed more certainly.

The internal combustion engine may be configured to be cooled with the refrigerant. In the exhaust gas control system, the cooling device may include a radiator configured to radiate heat of the refrigerant that traveled through the internal combustion engine. The cooling passage may be configured such that the refrigerant after traveling through the fuel addition valve and the urea addition valve in order merges with the refrigerant after traveling through the internal combustion engine and before flowing into the radiator. According to the above configuration, the refrigerant heated by the heat received from the fuel addition valve and the urea addition valve flows into the radiator without traveling through other cooling objects. As a result, it becomes possible to cool the fuel addition valve and the urea addition valve without degrading the cooling efficiency of other cooling objects.

The internal combustion engine may include a supercharger. In the exhaust gas control system, the supercharger may be configured such that a compressor is driven when a turbine is driven with exhaust gas energy of the internal combustion engine. The supercharger may be configured to be cooled with the refrigerant. The cooling passage may be disposed in parallel with a passage that carries the refrigerant flowing through the supercharger.

Here, the exhaust gas turbine supercharger is often disposed adjacent to the internal combustion engine like the fuel addition valve. Accordingly, the temperature of the exhaust gas turbine supercharger tends to increase. Therefore, when the cooling passage is disposed in series with a channel that carries the refrigerant flowing through the exhaust gas turbine supercharger, a component member to be cooled first, out of the component members including the exhaust gas turbine supercharger and a set of two addition valves, discharges heat to the refrigerant. Accordingly, the discharged heat may adversely affect the cooling efficiency of the component member to be cooled later. On the contrary, when the passage that carries the refrigerant flowing through the exhaust gas turbine supercharger is disposed in parallel with the cooling passage, it becomes possible to prevent the cooling efficiency of any one component member, out of the component members including the exhaust gas turbine supercharger and a set of the two addition valves, from being affected by the heat of the other component member.

The above configuration makes it possible to suitably cool the fuel addition valve and the urea addition valve included in the exhaust gas control system.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Specific embodiments of the present disclosure will be described hereinbelow with reference to the accompanying drawings. Note that sizes, materials, shapes, and relative arrangements of component members disclosed in the embodiments are not intended to restrict the technical scope of the present disclosure thereto unless otherwise specified.

Figure 1:
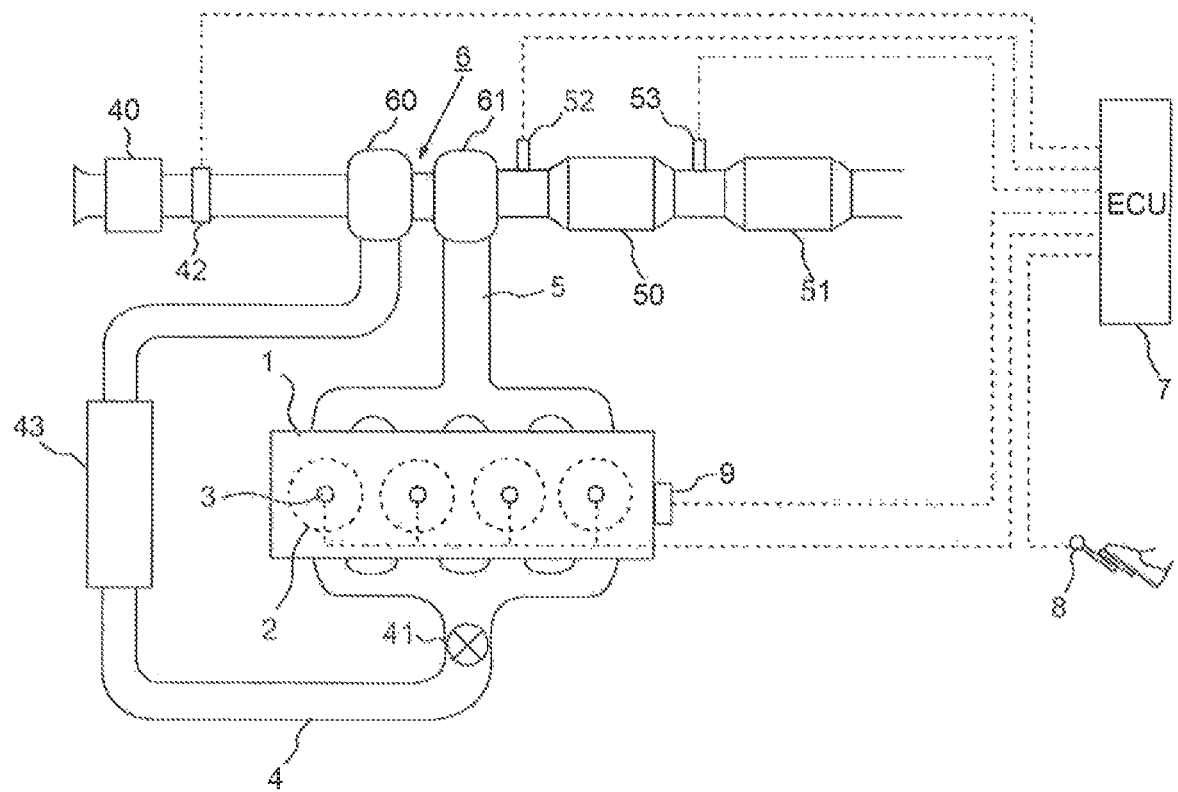
FIG. 1 illustrates a schematic configuration of an internal combustion engine and an intake and exhaust system thereof in a first embodiment.

First, a first embodiment of the present disclosure will be described with reference to FIGS. 1 through 4. FIG. 1 illustrates a schematic configuration of an internal combustion engine according to the present disclosure. The internal combustion engine 1 illustrated in FIG. 1 is a compression ignition-type internal combustion engine (diesel engine) operated at an air-fuel ratio leaner than a stoichiometric air fuel ratio. In the example illustrated in FIG. 1, the internal combustion engine 1 has four cylinders 2 disposed in series. However, the internal combustion engine 1 may have three cylinders 2 or less, or may have live cylinders 2 or more. The cylinders 2 of the internal combustion engine 1 each have a fuel injection valve 3 attached to inject fuel into the cylinder 2.

The internal combustion engine 1 is connected to an intake passage 4. The intake passage 4 is a passage for guiding the air, which is taken in from the atmosphere, to each of the cylinders 2. In the vicinity of an upstream end of the intake passage 4, an air cleaner box 40 is attached for collecting dust and the like in the air. In a portion of the intake passage 4 downstream from the air cleaner box 40, a throttle valve 41 is attached for regulating the amount of air flowing through the intake passage 4. In a portion of the intake passage 4 between the throttle valve 41 and the air cleaner box 40, an air flowmeter 42 is attached to output an electrical signal correlated with the amount of air (the amount of intake air) flowing through the intake passage 4.

The internal combustion engine 1 is connected to an exhaust passage 5. The exhaust passage 5 is a passage for passing burned gas (exhaust gas) that is burned inside the cylinder 2. In some midpoint of the exhaust passage 5, an upstream casing 50 is disposed. The upstream casing 50 houses an oxidation catalyst formed from a honeycomb structured body carrying a noble metal (such as platinum, palladium, or rhodium), and a particulate filter. The upstream casing 50 including the oxidation catalyst and the particulate filter is one example of "upstream purification device." In a portion of the exhaust passage 5 downstream from the upstream casing 50, a downstream casing 51 is disposed. The downstream casing 51 houses an SCR catalyst formed from a honeycomb structured body made of cordierite or Fe—Cr—Al-based heat resisting steel, a zeolite-based coat layer coating the honeycomb structured body, and a noble metal (such as platinum and palladium) carried on the coat layer. The downstream casing 51 including the honeycomb structured body and the SCR catalyst is one example of "downstream purification device," In a portion of the exhaust passage 5 upstream from the upstream casing 50, a fuel addition valve 52 is disposed for adding fuel into exhaust gas. In a portion of the exhaust passage 5 between the upstream casing 50 and the downstream casing 51, a urea addition valve 53 is disposed for adding urea aqueous solution into exhaust gas.

The internal combustion engine 1 includes an exhaust gas turbine turbocharger (supercharger) 6 that compresses intake air using thermal energy of exhaust gas. The turbocharger 6 includes a turbine 61 disposed in a portion of the exhaust passage 5 upstream from the fuel addition valve 52, and a compressor 60 disposed in a portion of the intake passage 4 between the air flowmeter 42 and the throttle valve 41, The turbine 61 converts the thermal energy of exhaust gas into kinetic energy. The compressor 60 is a centrifugal compressor driven by the kinetic energy output from the turbine 61 to compress the intake air. The intake air compressed and thereby heated by the compressor 60 is cooled by an intercooler 43 disposed in a portion of the intake passage 4 between the compressor 60 and the throttle valve 41. The intercooler 43 is a heat exchanger that radiates the heat of intake air into the atmosphere or the coolant.

The internal combustion engine 1 configured as described before is provided along with an electronic control unit (ECU) 7. The ECU 7 is constituted of a CPU, a ROM, a RAM, a backup RAM, and the like. The thus-configured ECU 7 is electrically connected not only with the aforementioned air flowmeter 42 but also with various sensors such as an accelerator position sensor 8 and a crank position sensor 9. The accelerator position sensor 8 is a sensor that outputs an electrical signal correlated with an operation amount (accelerator opening) of an accelerator pedal. The crank position sensor 9 is a sensor that outputs an electrical signal correlated with a rotational position of an engine output shaft (crankshaft) of the internal combustion engine 1.

The ECU 7 is also electrically connected with various devices such as the fuel injection valve 3, the throttle valve 41, the fuel addition valve 52, and the urea addition valve 53 so as to be able to control the operating condition of the various devices. For example, the ECU 7 calculates a target fuel injection amount based on an engine load calculated from an output signal of the accelerator position sensor 8 and on an engine speed calculated based on an output signal of the crank position sensor 9, and controls the fuel injection valve 3 in accordance with the target fuel injection amount.

Moreover, when the oxidation catalyst of the upstream casing 50 is in an active state and the SCR catalyst of the downstream casing 51 is in an inactive state, the ECU 7 executes treatment (which is referred to as "catalyst warming up treatment" below) to add fuel into exhaust gas from the fuel addition valve 52 so as to increase the temperature of the SCR catalyst of the downstream casing 51 to an active temperature using reaction heat generated when the fuel is oxidized with the oxidation catalyst. Furthermore, when it is estimated that the amount of PM accumulated on the particulate filter of the upstream casing 50 is equal to or more than a specified threshold, the ECU 7 executes treatment (filter regeneration treatment) to add fuel into exhaust gas from the fuel addition valve 52 so as to increase the temperature of the particulate filter to a PM oxidable temperature using reaction heat generated when the fuel is oxidized with the oxidation catalyst. When the amount of ammonia ($NH_3$) adsorbed on the SCR catalyst of the downstream casing 51 ($NH_3$ adsorption amount) reaches a target adsorption amount or less, the ECU 7 executes treatment (which is referred to as "reducing agent supply treatment" below) to add urea aqueous solution into exhaust gas from the urea addition valve 53. The urea aqueous solution added into the exhaust gas from the urea addition valve 53 is pyrolyzed and hydrolyzed in the exhaust gas or in the SCR catalyst to form $NH_3$, and the formed $NH_3$ is adsorbed on the SCR catalyst. $NH_3$ adsorbed on the SCR catalyst reacts with $NO_X$ contained in exhaust gas, and reduces the $NO_X$ into nitrogen ($N_2$).

Here, when the fuel addition valve 52 or the urea addition valve 53 is exposed to high-temperature exhaust gas, the fuel stagnating in the vicinity of a nozzle hole of the fuel addition valve 52 or the urea aqueous solution stagnating in the vicinity of a nozzle hole of the urea addition valve 53 may be overheated to the temperature at which the fuel or the urea aqueous solution deteriorates. For example, when the fuel addition valve 52 is overheated, the fuel stagnating in the vicinity of the nozzle hole of the fuel addition valve 52 may deteriorate (for example, carbonize), which may induce clogging of the nozzle hole of the fuel addition valve 52. When clogging of the nozzle hole of the fuel addition valve 52 occurs and the aforementioned catalyst warming up treatment or filter regeneration treatment is executed, it may become difficult to heat the SCR catalyst or the particulate filter to a desired temperature. When the urea addition valve 53 is overheated, the urea aqueous solution stagnating in the vicinity of the nozzle hole of the urea addition valve 53 may deteriorate to urea crystal, cyanuric acid, melanin, or the like, which may induce clogging of the nozzle hole of the urea addition valve 53. When clogging of the nozzle hole of the urea addition valve 53 occurs and the aforementioned reducing agent supply treatment is executed, it may become difficult to cause the $NH_3$ adsorption amount of the SCR catalyst to reach a target adsorption amount. To solve these problems, in the present embodiment, the fuel injection valve 3 and the urea addition valve 53 are cooled with coolant of the internal combustion engine 1.

Figure 2:
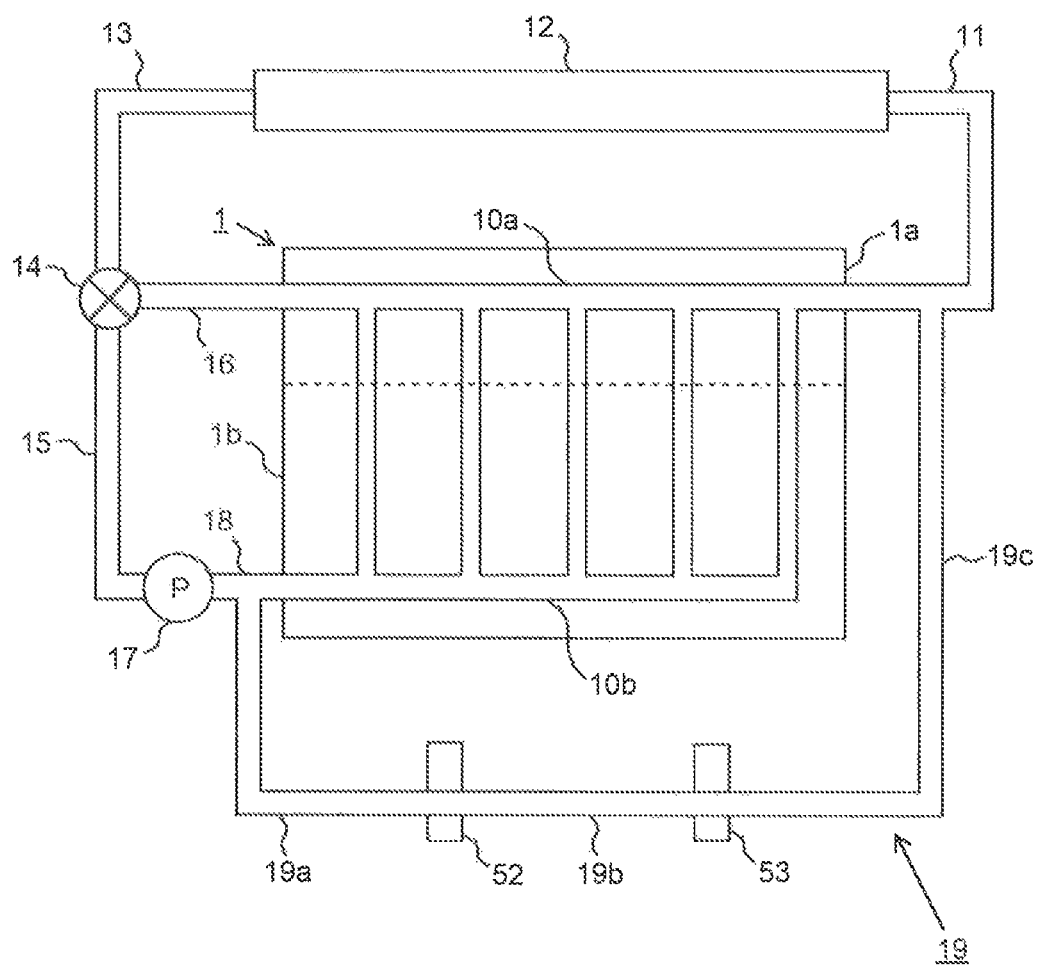
FIG. 2 illustrates the configuration of a cooling device in the first embodiment.

FIG. 2 illustrates the configuration of the cooling device of the present embodiment. The cooling device includes a head-side channel 10a provided in a cylinder head 1a of the internal combustion engine 1, and a block-side channel 10b provided in a cylinder block 1b of the internal combustion engine 1. The head-side channel 10a and the block-side channel 10b communicate with each other. The head-side channel 10a is connected to a coolant inlet of a radiator 12 through a first channel 11. The radiator 12 is a heat exchanger that radiates heat of the coolant into the atmosphere. The radiator 12 has a coolant outlet connected to a thermostat valve 14 through a second channel 13. The thermostat valve 14 is connected not only to the second channel 13, but also to a third channel 15 and a bypass channel 16. The third channel 15 is connected to a suction port of a water pump 17. The water pump 17 has a discharge port connected to the block-side channel 10b through a fourth channel 18. The bypass channel 16 is connected to the head-side channel 10a.

Here, the thermostat valve 14 is a channel switching valve that blocks either the second channel 13 or the bypass channel 16 in accordance with the temperature of the coolant. More specifically, when the temperature of the coolant flowing through the thermostat valve 14 is less than a specified valve opening temperature (for example, 80° C. to 90° C.), the thermostat valve 14 blocks the second channel 13 while opening the bypass channel 16, so that the third channel 15 is connected to the bypass channel 16. When the temperature of the coolant flowing the thermostat valve 14 is equal to the valve opening temperature or more, the thermostat valve 14 opens the second channel 13 while blocking the bypass channel 16, so that the third channel 15 is connected to the second channel 13.

Next, the fourth channel 18 has some midpoint connected to one end of a cooling passage 19. The other end of the cooling passage 19 is connected to some midpoint of the first channel 11. The cooling passage 19 is a passage for feeding coolant to the fuel addition valve 52 and the urea addition valve 53 in series. Here, since the urea aqueous solution tends to deteriorate at a temperature lower than the fuel deterioration temperature, a method for constituting the channel so that the urea addition valve 53 is cooled ahead of the fuel addition valve 52 is considered. However, when the urea addition valve 53 is cooled ahead of the fuel addition valve 52, the urea addition valve 53 may be exposed to the exhaust gas having relatively low temperature. In such a case, the urea addition valve 53 may be cooled to a temperature lower than the melting point of urea, so that urea may precipitate. Moreover, since the fuel addition valve 52 is disposed in a portion of the exhaust passage 5 upstream from the urea addition valve, the fuel addition valve 52 is more often exposed to high-temperature atmosphere than the urea addition valve 53. Accordingly, when the urea addition valve 53 is cooled ahead of the fuel addition valve 52, cooling of the fuel addition valve 52 may become insufficient, which may cause failure in suppressing deterioration of the fuel stagnating in the vicinity of the nozzle hole of the fuel addition valve 52. Accordingly, the cooling passage 19 in the present embodiment is configured such that the coolant cools the fuel addition valve 52 first and then the coolant cools the urea addition valve 53 subsequent to the fuel addition valve 52. The phrase "the coolant cools the urea addition valve 53 subsequent to the fuel addition valve 52" herein signifies that no cooling objects other than these fuel addition valve 52 and urea addition valve 53 are disposed between the fuel addition valve 52 and the urea addition valve 53. Hereinafter, a portion of the cooling passage 19 between the fourth channel 18 and the fuel addition valve 52 is referred to as a fifth channel 19a, a portion of the valve cooling passage 19 between the fuel addition valve 52 and the urea addition valve 53 is referred to as a sixth channel 19b, and a portion of the cooling passage 19 between the urea addition valve 53 and the first channel 11 is referred to as a seventh channel 19c.

Figure 3:
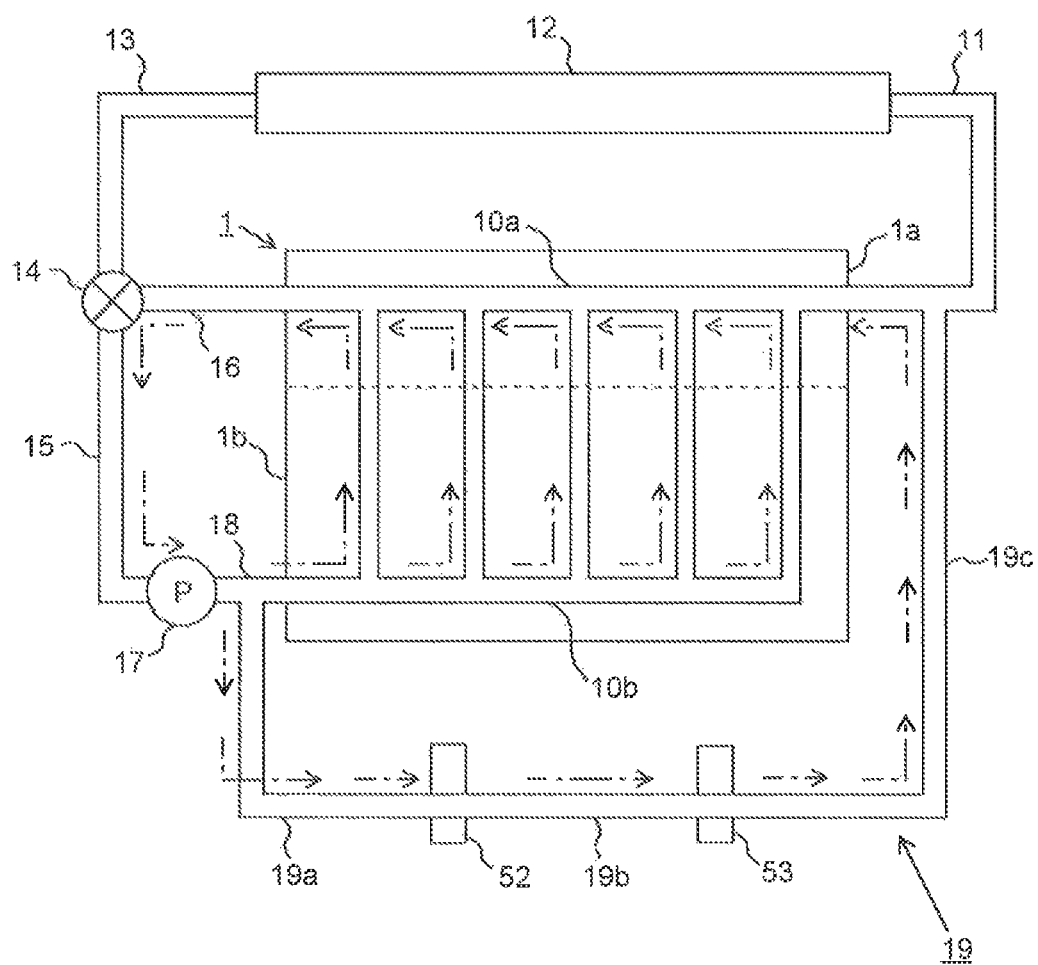
FIG. 3 illustrates the flow of coolant when the temperature of the coolant flowing through a thermostat valve is less than a valve opening temperature.

Hereinafter, the flow of the coolant in the aforementioned cooling device is described with reference to FIGS. 3 and 4. FIG. 3 illustrates the flow of coolant when the temperature of the coolant flowing through the thermostat valve 14 is less than the valve opening temperature as in the case of the internal combustion engine 1 being in a cold state. When the temperature of the coolant flowing through the thermostat valve 14 is lower than the valve opening temperature, the thermostat valve 14 is operated such that the second channel 13 is blocked, and the third channel 15 and the bypass channel 16 are connected as described before. As a result, a circuit is established in which the coolant discharged from the water pump 17 travels through the fourth channel 18, the block-side channel 10b, the head-side channel 10a, the bypass channel 16, the thermostat valve 14, and the third channel 15 in order, and returns to the water pump 17. When such a circuit is established, the coolant bypasses the radiator 12, which suppresses temperature decrease in the coolant. As a result, unnecessary cooling of the internal combustion engine 1 is suppressed, so that warming of the internal combustion engine 1 is promoted.

When the temperature of the coolant flowing through the thermostat valve 14 is less than the valve opening temperature, not only the aforementioned circuit is established, but also another circuit is established in which the coolant discharged from the water pump 17 travels through the fourth channel 18, the fifth channel 19a, the fuel addition valve 52, the sixth channel 19b, the urea addition valve 53, the seventh channel 19c, the first channel 11, the head-side channel 10a, the bypass channel 16, the thermostat valve 14, and the third channel 15 in order, and returns to the water pump 17. Here, when the temperature of the coolant flowing through the thermostat valve 14 is less than the valve opening temperature, it is estimated that the temperature of the fuel addition valve 52 and the urea addition valve 53 is also low. When the temperature of the fuel addition valve 52 and the urea addition valve 53 is low, it becomes hard for the fuel added into exhaust gas from the fuel addition valve 52 and the urea aqueous solution added into exhaust gas from the urea addition valve 53 to atomize. In this case, if the circuit as illustrated in FIG. 3 is established, the fuel addition valve 52 and the urea addition valve 53 are warmed with the coolant whose temperature is increased by the heat received from the internal combustion engine 1. As a result, it becomes easy for the fuel added into exhaust gas from the fuel addition valve 52 and the urea aqueous solution added into exhaust gas from the urea addition valve 53 to atomize.

Figure 4:
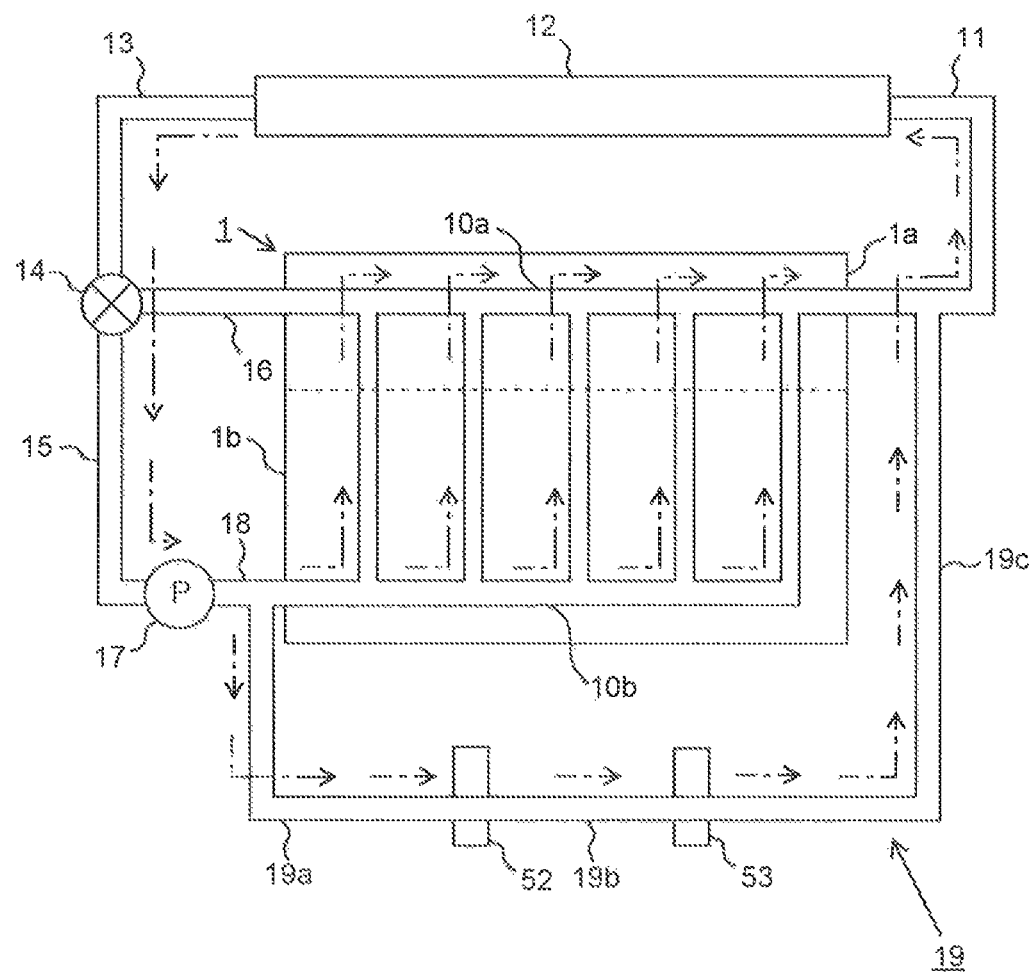
FIG. 4 illustrates the flow of coolant when the temperature of the coolant flowing through the thermostat valve is equal to or more than the valve opening temperature.

Now, FIG. 4 illustrates the flow of coolant when the temperature of the coolant flowing through the thermostat valve 14 is equal to or more than the valve opening temperature as in the case of the internal combustion engine 1 being in a warming-up completed state. When the temperature of the coolant flowing through the thermostat valve 14 is equal to or more than the valve opening temperature, the thermostat valve 14 is operated such that the bypass channel 16 is blocked, and the second channel 13 and the third channel 15 are connected as described before. Accordingly, a circuit is established in which the coolant discharged from the water pump 17 travels through the fourth channel 18 the block-side channel 10b, the head-side channel 10a, the first channel 11, the radiator 12, the second channel 13, the thermostat valve 14, and the third channel 15 in order, and returns to the water pump 17. When such a circuit is established, the coolant heated through the block-side channel 10b and the head-side channel 10a travels through the radiator 12, where the heat of the coolant is radiated by the radiator 12. As a consequence, the coolant having relatively low-temperature after radiating heat in the radiator 12 flows into the head-side channel 10a and the block-side channel 10b, so that the internal combustion engine 1 is suitably cooled. As a result, overheating of the internal combustion engine 1 is suppressed.

When the temperature of the coolant flowing through the thermostat valve 14 is equal to or more than the valve opening temperature, not only the aforementioned circuit is established, but also another circuit is established in which the coolant discharged from the water pump 17 travels through the fourth channel 18, the fifth channel 19a, the fuel addition valve 52, the sixth channel 19b, the urea addition valve 53, the seventh channel 19c, the first channel 11, the radiator 12, the second channel 13, the thermostat valve 14, and the third channel 15 in order, and returns to the water pump 17. When such a circuit is established, the low-temperature coolant after radiating heat in the radiator 12 and before flowing into the block-side channel 10b cools the fuel addition valve 52 and the urea addition valve 53 in order. Here, when the temperature of the coolant flowing through the thermostat valve 14 is equal to or more than the valve opening temperature, the fuel addition valve 52 and the urea addition valve 53 are also exposed to the exhaust gas having high temperature to some extent. Accordingly, the temperature of the fuel addition valve 52 and the urea addition valve 53 tends to increase. When the fuel addition valve 52 and the urea addition valve 53 are cooled by the low-temperature coolant after radiating heat in the radiator 12 and before flowing into the block-side channel 10b in the state where the temperature of the fuel addition valve 52 and the urea addition valve 53 tends to increase, the temperature increase in the fuel addition valve 52 and the urea addition valve 53 is suppressed. Particularly, out of the fuel addition valve 52 and the urea addition valve 53, the fuel addition valve 52 that tends to be exposed to high-temperature atmosphere more is cooled in preference to the urea addition valve 53. As a result, it becomes possible to prevent the fuel addition valve 52 from being overheated to the temperature that causes deterioration of the fuel. Moreover, since the urea addition valve 53 is cooled with the coolant after receiving heat of the fuel addition valve 52, it becomes possible to prevent the urea addition valve 53 from being overcooled to the temperature lower than the melting point of urea.

When an unburned fuel component that is left unburned is contained in the exhaust gas of the internal combustion engine 1, the unburned fuel component is oxidized in the oxidation catalyst of the upstream casing 50. As a consequence, the urea addition valve 53 is exposed to the exhaust gas whose temperature is increased die to the reaction heat generated during the oxidation process. When the aforementioned catalyst warming up treatment is executed, fuel is supplied from the fuel addition valve 52 to the oxidation catalyst to actively increase the amount of reaction heat generated in the oxidation catalyst. As a result, the urea addition valve 53 is exposed to the exhaust gas having higher temperature. When the urea addition valve 53 is exposed to the exhaust gas having higher temperature due to various factors as described before, the temperature of the urea addition valve 53 also tends to increase. However, the cooling passage 19 of the present embodiment is configured such that no cooling objects other than the fuel addition valve 52 and the urea addition valve 53 are disposed between these two addition valves. As a consequence, the temperature of the coolant at the time of traveling through the urea addition valve 53 can be suppressed as low as possible in the range where overcooling of the urea addition valve 53 can be suppressed. As a result, it becomes possible to suitably prevent the urea addition valve 53 from being overheated to the temperature that causes deterioration of the urea aqueous solution.

Furthermore, when the aforementioned filter regeneration treatment is executed, the particulate filter is heated to a PM oxidable temperature. Accordingly, it is assumed that the urea addition valve 53 is exposed to the exhaust gas whose temperature drastically increases. However, the cooling passage 19 of the present embodiment is configured such that no cooling objects other than the fuel addition valve 52 and the urea addition valve 53 are disposed between these two addition valves as described before. As a consequence, the temperature of the coolant at the time of reaching the urea addition valve 53 can be suppressed as low as possible in the range where overcooling of the urea addition valve 53 can be suppressed. As a result, it becomes possible to suitably prevent the urea addition valve 53 from being overheated to the temperature that causes deterioration of the urea aqueous solution, even in the case where the urea addition valve 53 is exposed to the exhaust gas whose temperature is increased by execution of the filter regeneration treatment.

Therefore, the cooling device of the present embodiment can suppress overcooling of the urea addition valve 53, while suppressing overheating of the fuel addition valve 52 and the urea addition valve 53. Since the cooling passage 19 in the present embodiment is configured such that the coolant flows through the fuel addition valve 52 and the urea addition valve 53 in series, it becomes possible to suppress degradation in on-vehicle mountability of the cooling device as compared with the configuration in which the coolant flows through the fuel addition valve 52 and the urea addition valve 53 in parallel.

In the present embodiment, the coolant of the internal combustion engine 1 is used as refrigerant for cooling the fuel addition valve 52 and the urea addition valve 53. However, other refrigerants such as lubricant oil of the internal combustion engine 1 or a gear transmission may also be used. In that case, a low-temperature lubricant oil after traveling through an oil cooler that radiates heat of the lubricant oil to the atmosphere or to the coolant and before traveling through a lubrication target may be fed to the fuel addition valve 52 and the urea addition valve 53 in order.

A description is now given of a first modification of the first embodiment. When the turbocharger 6 is a water-cooled type turbocharger cooled with the coolant of the internal combustion engine 1, and a passage that carries the coolant traveling through the turbocharger 6 is disposed in series with the cooling passage 19, the cooling efficiency of the turbocharger 6 may possibly degrade, or the cooling efficiency of the fuel addition valve 52 and the urea addition valve 53 may possibly degrade.

For examples, when the cooling passage 19 is disposed in series with a downstream portion of the passage that carries the coolant traveling through the turbocharger 6, the fuel addition valve 52 and the urea addition valve 53 are cooled with the coolant having high temperature due to the heat received from the turbocharger 6. Accordingly, the amount of heat radiated from the fuel addition valve 52 and the urea addition valve 53 to the coolant decreases, which degrades the cooling efficiency of the fuel addition valve 52 and the urea addition valve 53. As a result, the fuel addition valve 52 may be overheated to the temperature that causes deterioration of fuel, or the urea addition valve 53 may be overheated to the temperature that causes deterioration of the urea aqueous solution.

When the cooling passage 19 is disposed in series with an upstream portion of the passage that carries the coolant traveling through the turbocharger 6, the turbocharger 6 is cooled with the coolant having high temperature due to the heat received from the fuel addition valve 52 and the urea addition valve 53. As a result, the cooling efficiency of the turbocharger 6 degrades. This may cause rotation failure of a shaft that couples a turbine wheel of the turbocharger 6 and a compressor wheel.

Figure 5:
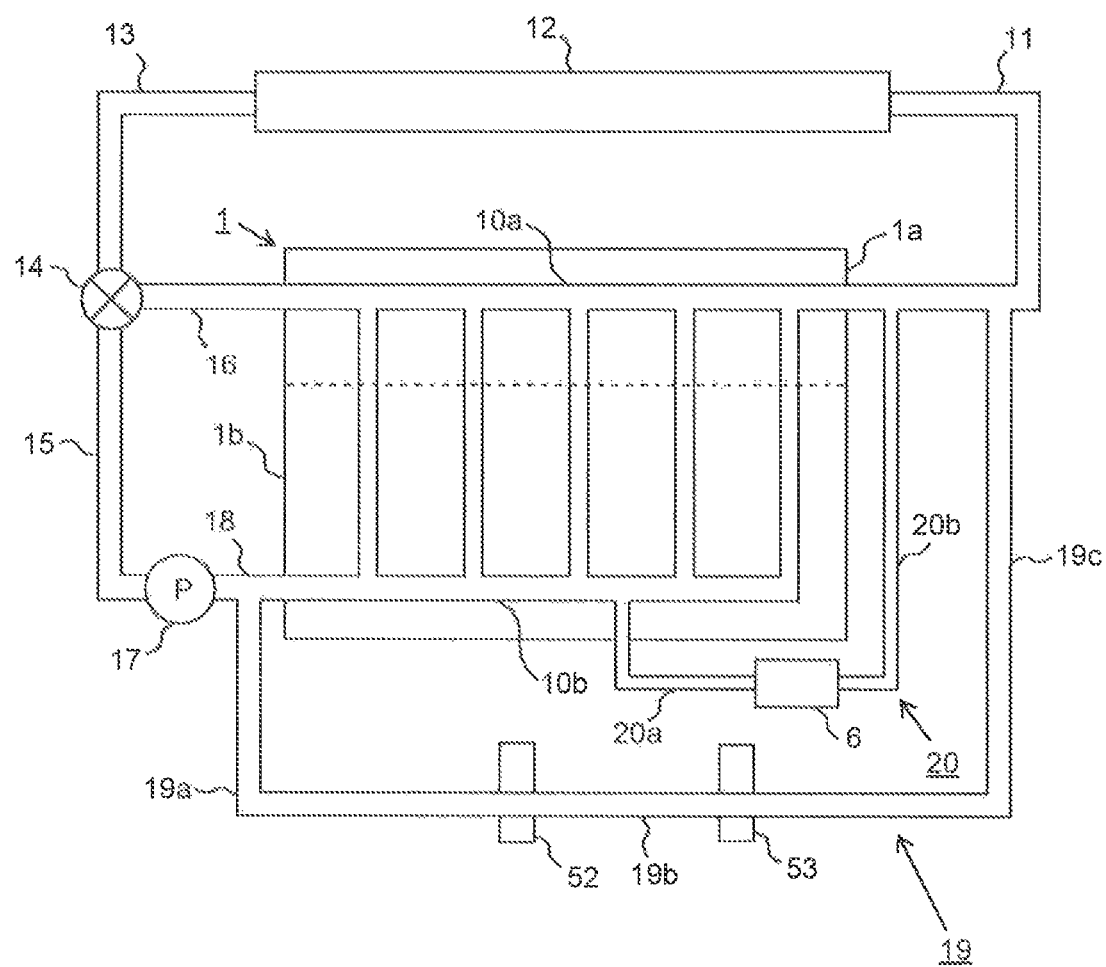
FIG. 5 illustrates the configuration of a cooling device in a first modification of the first embodiment.

In such circumstances, in the present modification, the passage that carries the coolant traveling through the turbocharger 6 is disposed in parallel with the cooling passage 19 when the turbocharger 6 is the water-cooled type turbocharger. FIG. 5 illustrates the configuration of the cooling device of the present modification. In FIG. 5, component members similar to those in the first embodiment described before are designated by similar reference signs.

As illustrated in FIG. 5, the passage (which is referred to as "TC channel" below) 20 that carries the coolant traveling through the turbocharger 6 is constituted of an eighth channel 20a branching from some midpoint of the block-side channel 10b and extending to the turbocharger 6, and a ninth channel 20b extending from the turbocharger 6 and merging with some midpoint of the first channel 11. According to such a configuration, since the TC channel 20 is disposed in parallel with the cooling passage 19, it becomes possible to suppress degradation in the cooling efficiency of the turbocharger 6, and degradation in the cooling efficiency of the fuel addition valve 52 and the urea addition valve 53.

The cooling passage 19 is also disposed in parallel with passages that carry the coolant traveling through water-cooled type auxiliary machines (such as a water-cooled type oil cooler) other than the turbocharger 6. In other words, no cooling objects (such as the turbocharger 6 and the water-cooled oil cooler) other than the two addition valves are disposed in a route extending from the water pump 17 and through the fourth channel 18, the cooling passage 19, and the first channel 11 to the coolant inlet of the radiator 12. According to such a configuration, it becomes possible to cool the fuel addition valve 52 and the urea addition valve 53, without affecting the cooling efficiency of the cooling objects other than the two addition valves.

A description is given of a second modification of the first embodiment. In the aforementioned first embodiment, the fuel addition valve 52 and the urea addition valve 53 are cooled with the coolant taken out from some midpoint of the fourth channel 18. However, the fuel addition valve 52 and the urea addition valve 53 may be cooled with the coolant taken out from some midpoint of the block-side channel 10b. More specifically, as illustrated in FIG. 6, one end (an upstream end of the fifth channel 19a) of the cooling passage 19 may be connected to some midpoint of the block-side channel 10b.

Figure 6:
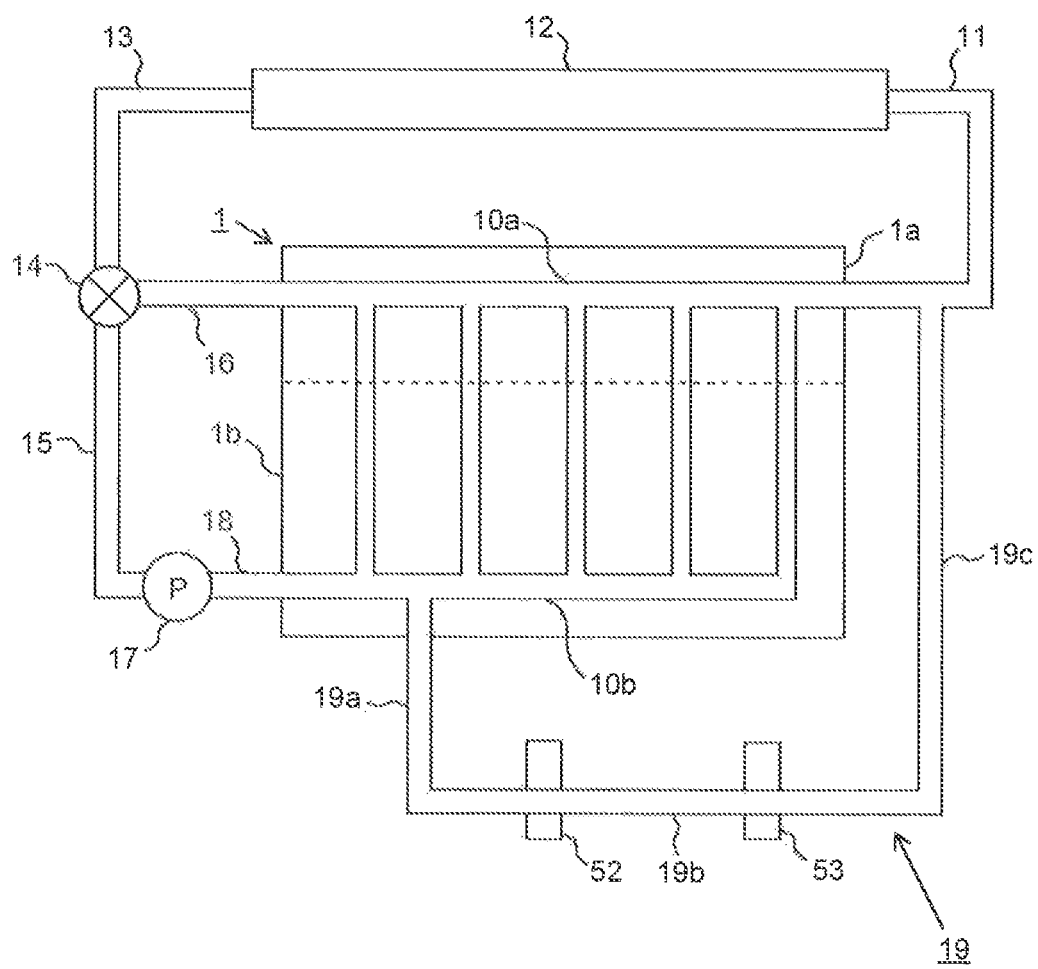
FIG. 6 illustrates the configuration of a cooling device in a second modification of the first embodiment.

According to the configuration illustrated in FIG. 6, the coolant after radiating heat in the radiator 12 is heated to some extent due to the heat received from the cylinder block 1b. In this state, the coolant cools the fuel addition valve 52 and the urea addition valve 53. As a consequence, the cooling device configured as illustrated in FIG. 6 may be suitable when at least the urea addition valve 53, out of the fuel addition valve 52 and the urea addition valve 53, is disposed at a position distanced from the internal combustion engine 1 (for example, a position on the bottom face of the vehicle exposed to running wind). Assume the case where low-temperature coolant after radiating heat in the radiator 12 and before flowing into the block-side channel 10b cools the urea addition valve 53 and the fuel addition valve 52 as described in the first embodiment when the urea addition valve 53 is disposed in a position distanced from the internal combustion engine 1. In this case, the urea addition valve 53 may excessively be cooled to the temperature that induces precipitation of urea due to a synergetic effect of the cooling effect by the low-temperature coolant and the cooling effect by the running wind. Contrary to this, as illustrated in FIG. 6, when the fuel addition valve 52 and the urea addition valve 53 are cooled with the coolant whose temperature is increased to some extent due to the heat received from the cylinder block 1b, it becomes possible to suppress overcooling of the urea addition valve 53. However, when the fuel addition valve 52 is cooled with the coolant whose temperature is increased to some extent due to the heat received from the cylinder block 1b, there is a risk of the fuel addition valve 52 being overheated. However, since the block-side channel 10b is a portion that carries a large amount of the coolant as compared with other channels, it is possible to take out a relatively large amount of the coolant from the block-side channel 10b to the cooling passage 19. That is, the amount of coolant traveling through the fuel addition valve 52 per unit time can be made relatively large. This makes it possible to prevent overcooling of the urea addition valve 53, while suppressing overheating of the fuel addition valve 52 and the urea addition valve 53.

Figure 7:
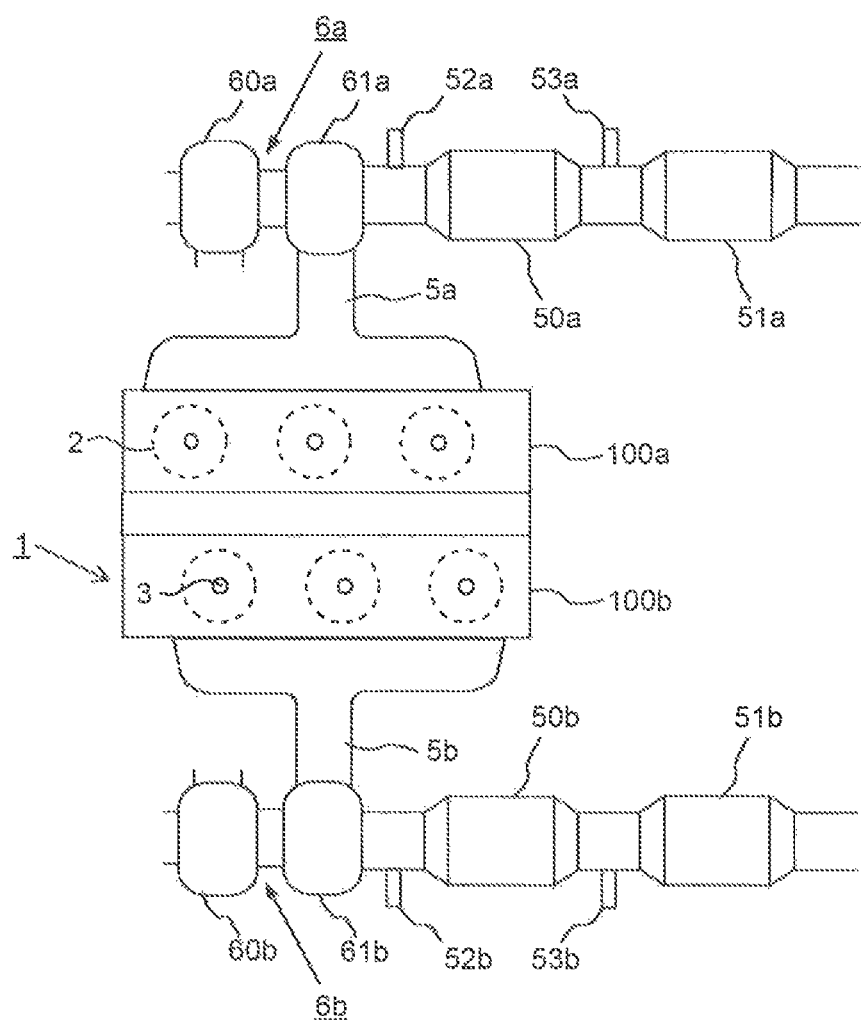
FIG. 7 illustrates a schematic configuration of an internal combustion engine and an exhaust system thereof in a second embodiment.
Figure 8:
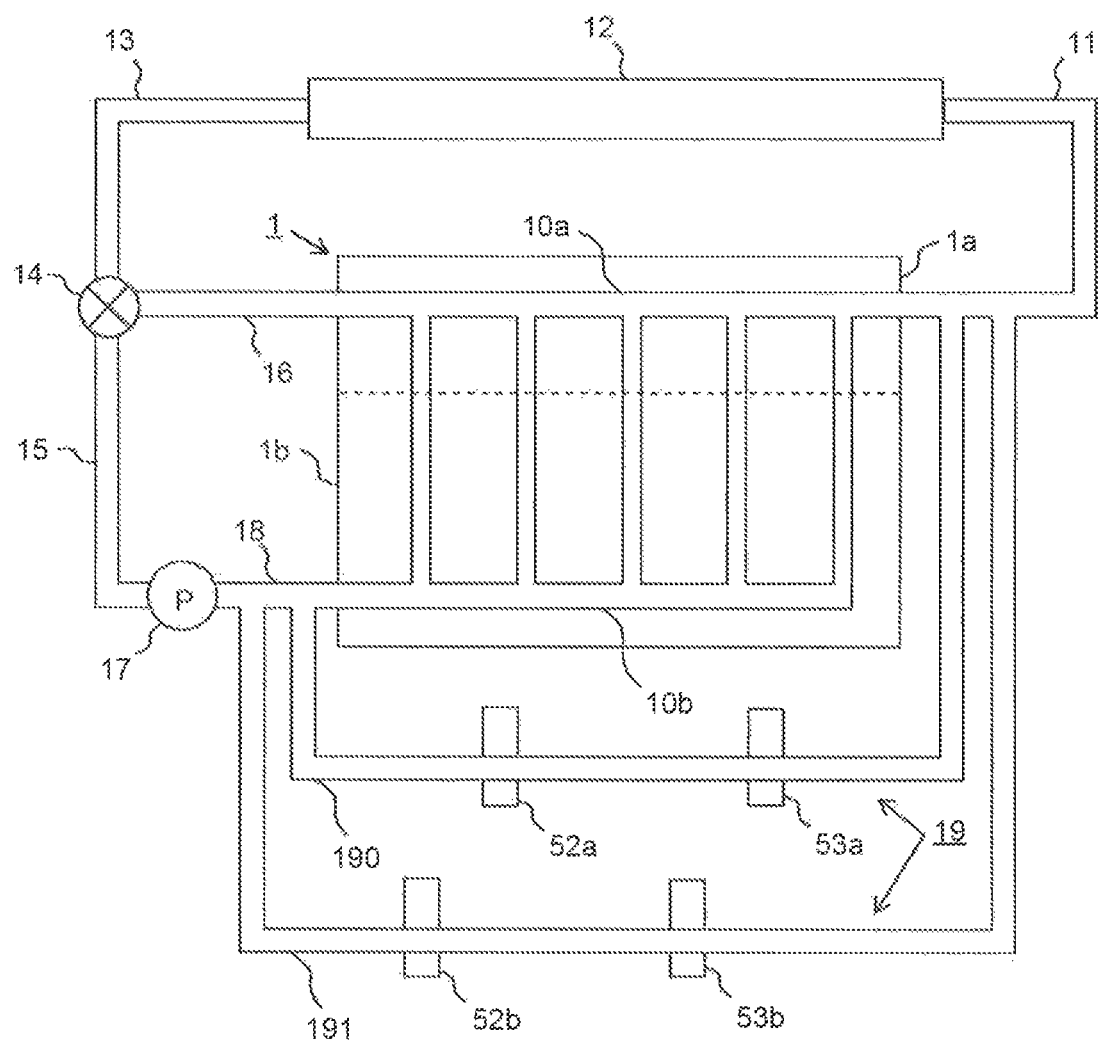
FIG. 8 illustrates the configuration of a cooling device in the second embodiment.

A description is now given of a second embodiment of the present disclosure with reference to FIGS. 7 and 8. Here, configuration aspects other than those described in the first embodiment will be described, while description of similar configuration aspects is omitted.

In the aforementioned first embodiment, the exhaust gas control system for an internal combustion engine has one system. However, in the present embodiment, the exhaust gas control system for an internal combustion engine is divided into two systems. FIG. 7 illustrates a schematic configuration of an internal combustion engine and an exhaust system thereof in the present embodiment. In FIG. 7, component members similar to those in the aforementioned first embodiment are designated by similar reference signs.

The internal combustion engine 1 illustrated in FIG. 7 includes two cylinder blocks (banks) 100a, 100b disposed in a V-shape, in the example illustrated in FIG. 7, the banks 100a, 100b are each provided with three cylinders 2. However, the banks 100a, 100b may each be provided with two cylinders 2 or less, or four cylinders 2 or more.

Out of the two banks 100a, 100b, one bank 100a (which is referred to as "first bank 100a" below) is connected to a first exhaust passage 5a, in the course of the first exhaust passage 5a, a turbine 61a of a first turbocharger 6a, a first fuel addition valve 52a, a first upstream casing 50a, a first urea addition valve 53a, and a first downstream casing 51a are disposed in order from an upstream side in a flow direction of exhaust gas.

Out of the two banks 100a, 100b, the other bank 100b (which is referred to as "second bank 100b" below) is connected to a second exhaust passage 5b. In the course of the second exhaust passage 5b, a turbine 61a of a second turbochargers 6b, a second fuel addition valve 52b, a second upstream casing 50b, a second urea addition valve 53b, and a second downstream casing 51b are disposed in order from an upstream side in the flow direction of exhaust gas.

A portion of the first exhaust passage 5a downstream from the first downstream casing 51a and a portion of the downstream second exhaust passage 5b downstream from the second downstream casing 51b may merge with each other or may be independent of each other until they reach a tail end (atmosphere release end).

Here, the first upstream casing 50a and the second upstream casing 50b house an oxidation catalyst and a particulate filter like the upstream casing 50 in the first embodiment described before. The first downstream casing 51a and the second downstream casing 51b house an SCR catalyst like the downstream casing 51 in the first embodiment described before.

A reference sign 60a in FIG. 7 designates a compressor of the first turbocharger 6a. A reference sign 60b FIG. 7 designates a compressor of the second turbochargers 6b.

Next, FIG. 8 illustrates the configuration of the cooling device of the present embodiment, in FIG. 8, component members similar to those in the first embodiment described before are designated by similar reference signs. The cooling passage 19 in the present embodiment includes a first cooling passage 190, and a second cooling passage 191 disposed in parallel with the first cooling passage 190. The first cooling passage 190 is a channel branching from some midpoint of the fourth channel 18 and extending through the first fuel addition valve 52a and the first urea addition valve 53a in order before merging with some midpoint of the first channel 11. In that case, the first cooling passage 190 is configured such that the coolant taken out from the fourth channel 18 cools the first fuel addition valve 52a first and then cools the first urea addition valve 53a subsequent to the first fuel addition valve 52a. That is, the first cooling passage 190 is configured such that no cooling objects other than the first fuel addition valve 52a and the first urea addition valve 53a are disposed between these first fuel addition valve 52a and first urea addition valve 53a. The second cooling passage 191 is a channel branching from some midpoint of the fourth channel 18 and extending through the second fuel addition valve 52b and the second urea addition valve 53b in order before merging with some midpoint of the first channel 11. In that case, the second cooling passage 191 is configured such that the coolant taken out from the fourth channel 18 cools the second fuel addition valve 52b first and then cools the second urea addition valve 53b subsequent to the second fuel addition valve 52b. That is, the second cooling passage 191 is configured such that no cooling objects other than the second fuel addition valve 52b and the second urea addition valve 53b are disposed between these second fuel addition valve 52b and second urea addition valve 53b.

According to the cooling passage 19 configured as illustrated in FIG. 8, it becomes possible to suppress overcooling of the urea addition valves 53a, 53b while suppressing overheating of the fuel addition valves 52a, 52b and the urea addition valves 53a, 53b as in the aforementioned first embodiment.

A description is given of a modification of the second embodiment. In the second embodiment described before, the exhaust gas control system is divided into two systems. However, in the present modification, part of the exhaust gas control system is divided into two systems.

Figure 9:
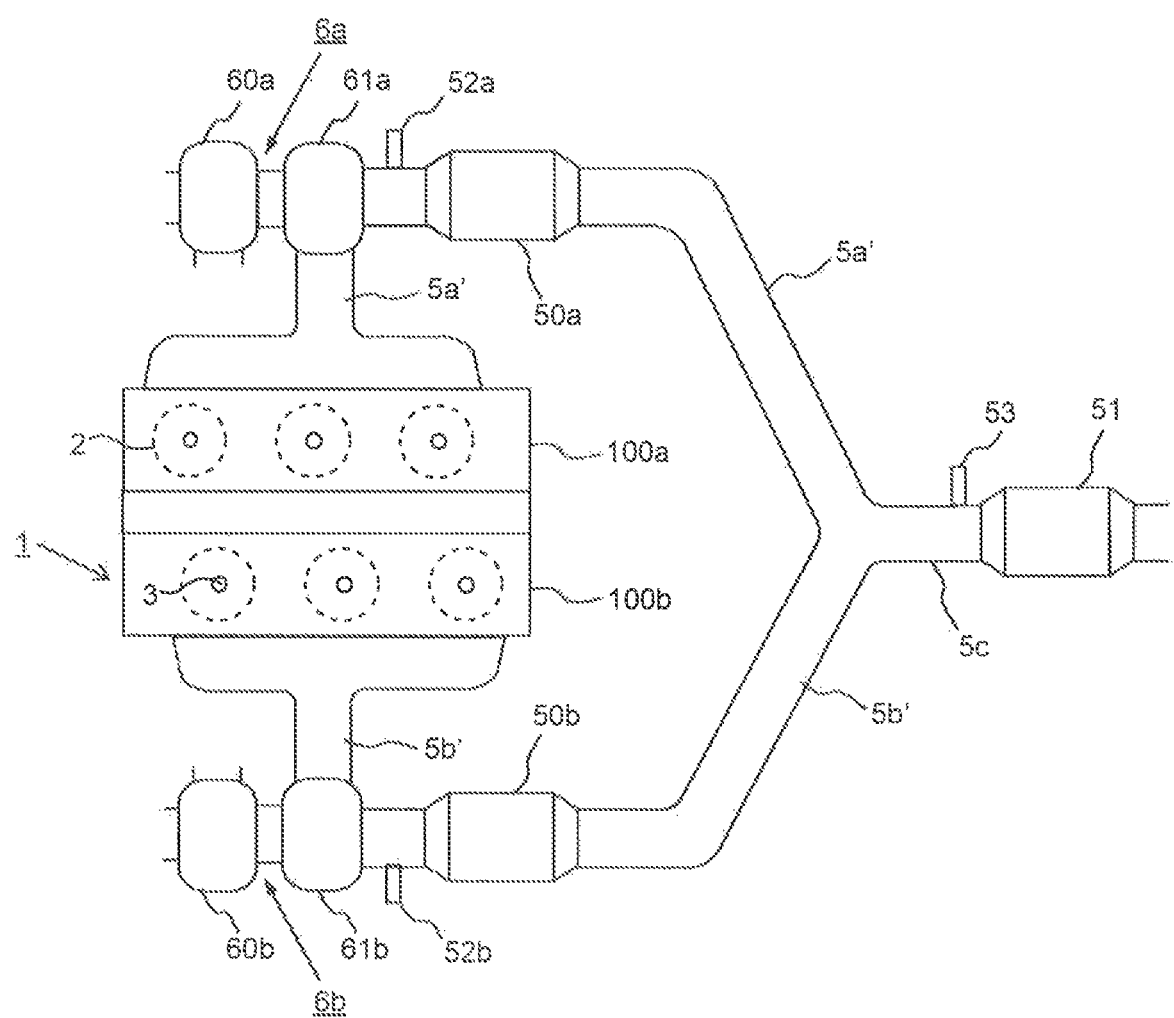
FIG. 9 illustrates a schematic configuration of an internal combustion engine and an exhaust system thereof in a modification of the second embodiment.

FIG. 9 illustrates a schematic configuration of an internal combustion engine and an exhaust system thereof in the present modification. In FIG. 9, component members similar to those in the aforementioned second embodiment are designated by similar reference signs. The exhaust system of the internal combustion engine 1 illustrated in FIG. 9 includes a first exhaust passage 5a' connected to the first bank 100a, a second exhaust passage 5b' connected to the second bank 100b, and a third exhaust passage 5c formed from a merging portion of the first exhaust passage 5a' and the second exhaust passage 5b'. In the course of the first exhaust passage 5a', a turbine 61a of a first turbocharger 6a, a first fuel addition valve 52a, and a first upstream casing 50a are disposed in order from the upstream side in the flow direction of exhaust gas. In the course of the second exhaust passage 5b', a turbine 61b of a second turbochargers 6b, a second fuel addition valve 52b, and a second upstream casing 50b are disposed in order from the upstream side in the flow direction of exhaust gas. In the course of the third exhaust passage 5c, a urea addition valve 53 and a downstream casing 51 are disposed in order from the upstream side in the flow direction of exhaust gas.

Figure 10:
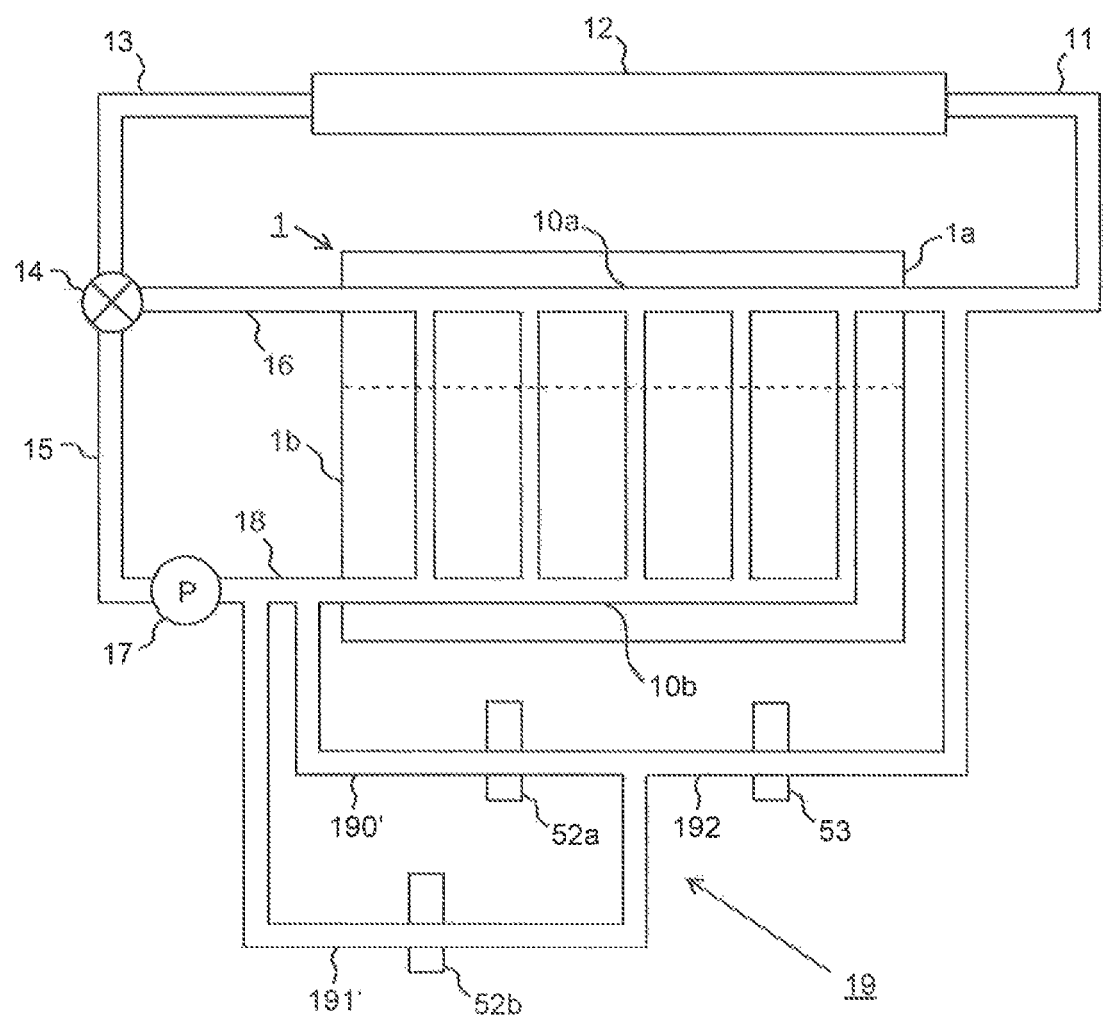
FIG. 10 illustrates the configuration of a cooling device in the modification of the second embodiment.

FIG. 10 illustrates the configuration of a cooling device in the present modification. In FIG. 10, component members similar to those in the aforementioned second embodiment are designated by similar reference signs. The cooling passage 19 in the present modification includes a first cooling passage 190', a second cooling passage 191' disposed in parallel with the first cooling passage 190', and a third cooling passage 192 connected to a merging portion where the first cooling passage 190' and the second cooling passage 19P merge with each other. The first cooling passage 190' is a channel branching from some midpoint of the fourth channel 18 and extending through the first fuel addition valve 52a. The second cooling passages 191' is a channel branching from some midpoint of the fourth channel 18 and extending through the second fuel addition valve 52b. The third cooling passage 192 is a channel extending through the urea addition valve 53 and then merging with some midpoint of the first channel 11.

Here, no cooling objects other than the first fuel addition valve 52a are disposed in the first cooling passage 190. Similarly, no objects other than the second fuel addition valve 52b are disposed in the second cooling passage 191'. No cooling objects other than the urea addition valve 53 are disposed in the third cooling passages 192.

According to the cooling device configured as described in the foregoing, the coolant that cooled the first fuel addition valve 52a cools the urea addition valve 53 subsequent to the first fuel addition valve 52a, and the coolant that cooled the second fuel addition valve 52b cools the urea addition valve 53 subsequent to the second fuel addition valve 52b. As a result, it becomes possible to prevent overcooling of the urea addition valve 53, while suppressing overheating of the fuel addition valves 52a, 52b and the urea addition valve 53 as in the aforementioned first embodiment.

In the second embodiment and the modification of the second embodiment described before, the V-type internal combustion engine was mentioned as an example. However, the configuration illustrated in FIG. 8 or 10 is applicable to, for example, an in-line multiple cylinder internal combustion engine including six or more cylinders disposed in series, in which part of the exhaust system is divided into two systems.

Now, a third embodiment of the present disclosure is described with reference to FIG. 11. Here, configuration aspects other than those described in the first embodiment will be described, while description of similar configuration aspects is omitted.

In the first embodiment described before, the cooling passage 19 is attached to the circuit through which the coolant of the internal combustion engine 1 circulates. In the present embodiment, the cooling passage 19 is attached to a cooling circuit of an intercooler 43 when the intercooler 43 is a water-cooled type heat exchanger.

Figure 11:
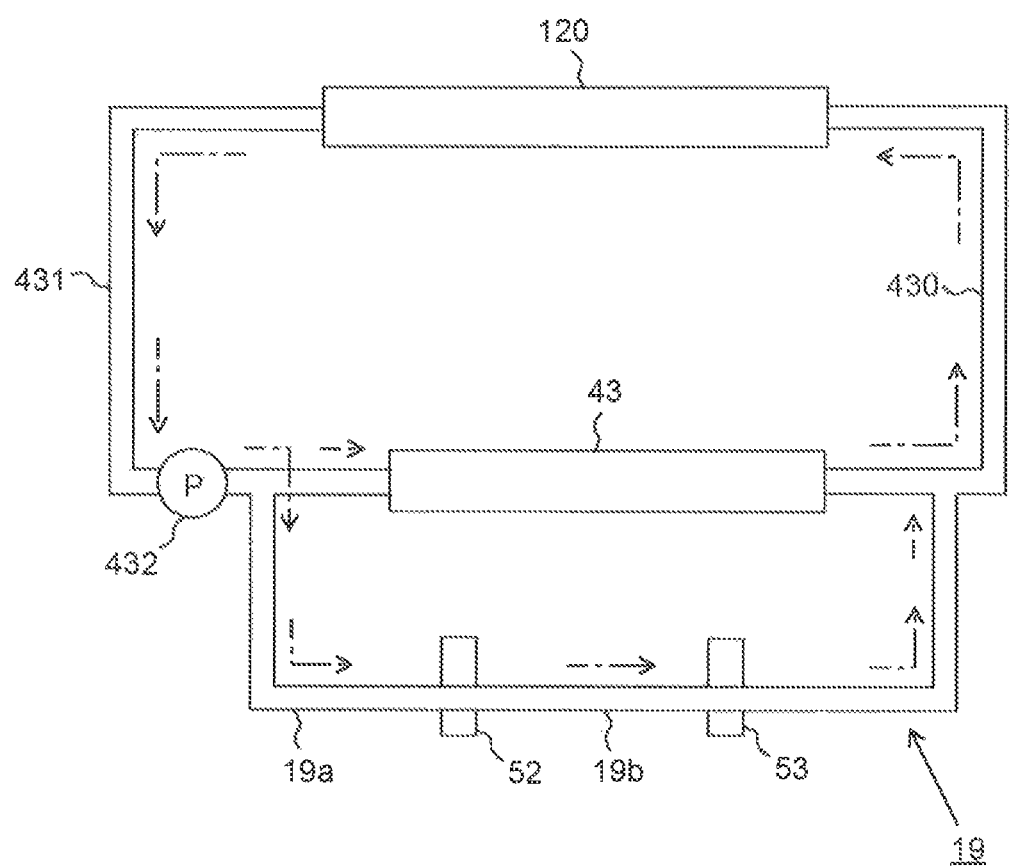
FIG. 11 illustrates the configuration of a cooling device in a third embodiment.

FIG. 11 illustrates the configuration of a cooling device of the present embodiment. The cooling device illustrated in FIG. 11 includes an outlet channel 430 that guides the coolant, which flows out of a coolant outlet of the intercooler 43, to a coolant inlet of a radiator 120 provided separately from the radiator 12 that radiates heat of the coolant of the internal combustion engine 1. The cooling device also includes an inlet channel 431 that guides the coolant flowing out of a coolant outlet of the radiator 120 to a coolant inlet of the intercooler 43. In some midpoint of the inlet channel 431, an electric water pump 432 is attached to pump out the coolant in the inlet channel 431 from a coolant outlet-side of the radiator 120 toward a coolant inlet-side of the intercooler 43. A portion of the inlet channel 431 between the electric water pump 432 and the intercooler 43 is connected to an upstream end of the cooling passage 19. A downstream end of the cooling passage 19 is connected to some midpoint of the outlet channel 430. The cooling passage 19 is configured such that the coolant cook the fuel addition valve 52 first and then cook the urea addition valve 53 subsequent to the fuel addition valve 52 as in the first embodiment described before.

According to the cooling device configured as described in the foregoing, the fuel addition valves 52 and the urea addition valve 53 are cooled with low-temperature coolant after radiating heat in the radiator 120 and before flowing into the intercooler 43. Accordingly, it becomes possible to suppress overheating of the fuel addition valves 52 and the urea addition valve 53. Moreover, since the urea addition valve 53 is cooled with the coolant after receiving heat of the fuel addition valve 52, it also becomes possible to prevent the urea addition valve 53 from being overcooled to the temperature lower than the melting point of urea. Furthermore, since the cooling passage 19 in the present embodiment is disposed in parallel with a channel that carries the coolant traveling through the intercooler 43, it becomes possible to cool the fuel addition valve 52 and the urea addition valve 53, without degrading the cooling efficiency of the intercooler 43.

What is claimed is:

1. An exhaust gas control system for an internal combustion engine, the internal combustion engine being a compression ignition-type internal combustion engine operated to perform lean combustion,
the exhaust gas control system comprising:
an upstream purification device disposed in an exhaust passage of the internal combustion engine, the upstream purification device including an oxidation catalyst;
a downstream purification device disposed in a portion of the exhaust passage downstream from the upstream purification device, the downstream purification device including a selective catalytic reduction catalyst;
a fuel addition valve disposed in a portion of the exhaust passage upstream from the upstream purification device, the fuel addition valve being configured to add fuel into exhaust gas of the internal combustion engine;
a urea addition valve disposed in a portion of the exhaust passage between the upstream purification device and the downstream purification device, the urea addition valve being configured to add urea aqueous solution into the exhaust gas; and
a cooling device having a cooling passage configured to carry refrigerant flowing through the cooling passage, the cooling passage being configured such that the refrigerant cools the fuel addition valve first and then cools the urea addition valve subsequent to the fuel addition valve.

2. The exhaust gas control system according to claim 1, wherein
the upstream purification device includes, in addition to the oxidation catalyst, a particulate filter configured to collect particulate matter in the exhaust gas.

3. The exhaust gas control system according to claim 1, wherein
the exhaust passage includes a first exhaust passage and a second exhaust passage,
the upstream purification device includes a first upstream purification device and a second upstream purification device,
the first upstream purification device is disposed in the first exhaust passage,
the second upstream purification device is disposed in the second exhaust passage,
the downstream purification device includes a first downstream purification device and a second downstream purification device,
the first downstream purification device is disposed in a portion of the first exhaust passage downstream from the first upstream purification device,
the second downstream purification device is disposed in a portion of the second exhaust passage downstream from the second upstream purification device,
the fuel addition valve includes a first fuel addition valve and a second fuel addition valve,
the first fuel addition valve is disposed in a portion of the first exhaust passage upstream from the first upstream purification device,
the second fuel addition valve is disposed in a portion of the second exhaust passage upstream from the second upstream purification device,
the urea addition valve includes a first urea addition valve and a second urea addition valve,
the first urea addition valve is disposed in a portion of the first exhaust passage between the first upstream purification device and the first downstream purification device,
the second urea addition valve is disposed in a portion of the second exhaust passage between the second upstream purification device and the second downstream purification device, and
the cooling passage includes a first cooling passage and a second cooling passage,
the first cooling passage is configured such that the refrigerant cools the first fuel addition valve first and then cools the first urea addition valve subsequent to the first fuel addition valve,
the second cooling passage is configured such that the refrigerant cools the second fuel addition valve first and then cools the second urea addition valve subsequent to the second fuel addition valve.

4. The exhaust gas control system according to claim 1, wherein
the exhaust passage includes a first exhaust passage, a second exhaust passage, and a third exhaust passage,
the third exhaust passage is connected to a merging portion between the first exhaust passage and the second exhaust passage,
the upstream purification device includes a first upstream purification device and a second upstream purification device,
the first upstream purification device is disposed in the first exhaust passage,
the second upstream purification device is disposed in the second exhaust passage,
the downstream purification device is disposed in the third exhaust passage, the fuel addition valve includes a first fuel addition valve and a second fuel addition valve, the first fuel addition valve is disposed in a portion of the first exhaust passage upstream from the first upstream purification device, the second fuel addition valve is disposed in a portion of the second exhaust passage upstream from the second upstream purification device, the urea addition valve is disposed in the third exhaust passage upstream from the downstream purification device, and the cooling passage includes a first cooling passage, a second cooling passage, and a third cooling passage, the first cooling passage is configured such that the refrigerant travels through the first fuel addition valve, the second cooling passage is configured such that the refrigerant travels through the second fuel addition valve, the third cooling passage is connected to a merging portion between the first cooling passage and the second cooling passage, the third cooling passage is configured such that the refrigerant that traveled through the first fuel addition valve and the second fuel addition valve travels through the urea addition valve, the first cooling passage, the second cooling passage, and the third cooling passage are configured such that the refrigerant that cooled the first fuel addition valve cools the urea addition valve subsequent to the first fuel addition valve, and the refrigerant that cooled the second fuel addition valve cools the urea addition valve subsequent to the second fuel addition valve.

5. The exhaust gas control system according to claim 1, wherein the internal combustion engine is configured to be cooled with the refrigerant, the cooling device includes a radiator configured to radiate heat of the refrigerant that traveled through the internal combustion engine, and the cooling passage is configured such that some of the refrigerant after traveling through the radiator and before traveling through the internal combustion engine flows through the fuel addition valve and the urea addition valve in order.

6. The exhaust gas control system according to claim 1, wherein the internal combustion engine is configured to be cooled with the refrigerant, the cooling device includes a radiator configured to radiate heat of the refrigerant that traveled through the internal combustion engine, and the cooling passage is configured such that the refrigerant after traveling through the fuel addition valve and the urea addition valve in order merges with the refrigerant after traveling through the internal combustion engine and before flowing into the radiator.

7. The exhaust gas control system according to claim 5, wherein the cooling passage is configured such that the refrigerant after traveling through the fuel addition valve and the urea addition valve in order merges with the refrigerant after traveling through the internal combustion engine and before flowing into the radiator.

8. The exhaust gas control system according to claim 1, wherein the internal combustion engine includes a supercharger, the supercharger is configured such that a compressor is driven when a turbine is driven with exhaust gas energy of the internal combustion engine, the supercharger is configured to be cooled with the refrigerant, and the cooling passage is disposed in parallel with a passage that carries the refrigerant flowing through the supercharger.

* * * * *